United States Patent [19]

Rush

[11] 4,378,976
[45] Apr. 5, 1983

[54] COMBINED SONIC AGGLOMERATOR/CROSS FLOW FILTRATION APPARATUS AND PROCESS FOR SOLID PARTICLE AND/OR LIQUID DROPLET REMOVAL FROM GAS STREAMS

[75] Inventor: William F. Rush, Tinley Park, Ill.

[73] Assignee: Institute of Gas Technology, Chicago, Ill.

[21] Appl. No.: 292,946

[22] Filed: Aug. 14, 1981

[51] Int. Cl.³ .................. B01D 51/04; B01D 51/08; B01D 46/24

[52] U.S. Cl. .......................... 55/15; 55/20; 55/80; 55/262; 55/277; 55/315; 55/340; 55/466; 55/DIG. 25; 422/186; 423/210

[58] Field of Search ............. 55/15, 20, 27, 80, 262, 55/268, 269, 277, 315, 330, 340, 417, 466, DIG. 25, 523; 422/186; 423/210

[56] References Cited

U.S. PATENT DOCUMENTS

| | | | |
|---|---|---|---|
| 2,391,863 | 1/1946 | Bowen | 55/340 |
| 2,474,017 | 6/1949 | Smith et al. | 55/431 |
| 2,535,700 | 12/1950 | Seavey et al. | 55/15 |
| 2,720,939 | 10/1955 | Stokes | 55/15 |
| 2,721,626 | 10/1955 | Rick | 55/97 |
| 3,172,744 | 3/1965 | Fortman et al. | 55/15 |
| 3,995,005 | 11/1976 | Teller | 423/210 R |
| 4,156,599 | 5/1979 | Margraf | 55/DIG. 25 |
| 4,319,891 | 3/1982 | Anderson et al. | 55/15 |

FOREIGN PATENT DOCUMENTS 2617491 11/1976 Fed. Rep. of Germany ........ 55/523

Primary Examiner—David L. Lacey

[57] ABSTRACT

A gas filtration apparatus and process is disclosed combining heating to maintain undesired material in the form of liquid droplets, sonic agglomeration and porous cross flow filtration. The apparatus and process are particularly suited to gas streams comprising particulates and/or liquid droplets of under 10 microns in diameter, such as the effluent gas stream of coal gasifiers, which are at a high temperature and high pressure. Liquid droplets in the gas stream are agglomerated by sonic agglomeration, and a portion of the gas stream is then passed through a porous cross flow filter element for separation of the agglomerates resulting in a clean gas stream by a continuous, low pressure drop and self-cleaning filtration process. The gas stream may be seeded to enhance agglomeration and/or to induce chemical reaction of undesired gaseous components for their removal as liquids.

32 Claims, 2 Drawing Figures

COMBINED SONIC AGGLOMERATOR/CROSS FLOW FILTRATION APPARATUS AND PROCESS FOR SOLID PARTICLE AND/OR LIQUID DROPLET REMOVAL FROM GAS STREAMS

BACKGROUND OF THE INVENTION

1. Field of the Invention

This invention relates to a gas filtration apparatus and process, and more particularly to a gas filtration apparatus and process which combines heating with sonic agglomeration and porous cross flow filtration for liquid droplet removal.

Gas streams comprising small solid particles and/or liquid droplets are produced by many chemical processes and by combustion processes, such as in the effluent gas stream of coal gasifiers. Such particulate matter, liquid droplets and frequently, undesired gases, should be removed before the gas stream is passed to downstream equipment or processes or is released to the atmosphere. It has been especially difficult to remove such particulate matter from high temperature and high pressure gas streams frequently encountered. Many of the conventional methods, such as cyclones and electrostatic precipitation, fail under high pressure and temperature conditions. Particles and droplets which are over 10 microns in diameter may be removed from gas streams by conventional porous filters and the like, but smaller particles and droplets are difficult to remove because the porosity of the filter must be so small that it creates a substantial pressure drop across the filter. This is undesirable because the higher pressure drop requires greater energy and may inhibit the combustion process. Thus, porous flow filters do not remove small particles or liquid droplets from gas streams efficiently. Liquid droplets may be more efficiently filtered by a cross flow filter than solid particles of corresponding size.

Small droplets in a turbulent gas stream collide with each other and may agglomerate with other droplets on impact to form larger agglomerates. The number of collisions may be increased by confining the stream in a tube or flue, and subjecting the droplets in the flue to a sonic field. Sonic agglomeration has been used for many years to agglomerate small solid particles or liquid droplets into larger agglomerates. Liquid droplets are easier to agglomerate by sonic agglomeration than solid particles of corresponding size.

DESCRIPTION OF THE PRIOR ART

Sonic agglomerators have been used in combination with inertial separators, such as cyclones, as described in U.S. Pat. No. 2,935,375. Cyclones spin the gas stream, exerting centrifugal force on the particles in the stream. This centrifugal force propels the particles against the outer wall of the cyclone, from which they may be removed. The agglomerates may break up into many small particles on impact with the outside wall, however, which negates the beneficial effects of the sonic agglomerator. U.S. Pat. No. 3,172,744 teaches placement of an ultrasonic agglomerator in the discharge of a cyclone separator. Also, small particles may follow the air stream through the clean gas exit rather than be removed by the device. U.S. Pat. Nos. 2,720,939 and 3,681,009 teach introducing secondary particles of water vapor into a particulate contaminated gas stream and then exposing the gas stream to a sonic field causing agglomeration followed by removal of the agglomerates from the gas stream in a cyclone separator. Inertial agglomeration such as taught by U.S. Pat. No. 4,139,351 has been suggested as a means for producing larger solid particles prior to filtration through a felt filter.

Non-inertial capture systems, such as electrostatic precipitation, do not suffer the limitations of cyclones, but are difficult to utilize at elevated temperatures and pressures due to problems such as electric arc breakdown.

Water vapor has been introduced into a gas stream to trap and remove particles which have been subjected to sonic agglomeration, as taught by U.S. Pat. No. 3,390,869, and water may be passed over a screen filter to remove agglomerated particles, as taught by U.S. Pat. No. 3,763,634. These systems are impractical in applications with high temperature gas streams. U.S. Pat. No. 3,834,123 teaches agglomeration of dust particles by ultrasonics, which is stated to be unreliable and requires too high an expenditure of energy for use in combination with pocket or bag textile filters and suggests recycling dust released from the filter to the contaminated gas stream. This patent teaches the necessity of reverse flow cleaning cycles when using a textile filter. U.S. Pat. No. 2,769,506 teaches vibration of bag filters by sound waves to free collected aerosols from the external surfaces of the bags. Bag filters, of course, cannot be used at high temperatures.

Sonic agglomeration has been used in combination with cross flow filtration to remove small solid particles, under 10 microns diameter, on a continuous basis from a high pressure gas stream, as described in U.S. Pat. No. 4,319,891. While this combination has improved solid particle removal, I have found that solid particle removal may be further improved by melting the solid particles and maintaining them in a liquid state during the filtration process, and preferably during agglomeration. Liquid droplets are easier to agglomerate in a sonic agglomerator, and are not susceptible to forming a cake on a rigid cross flow filter element, as are solid particles.

Accordingly, an object of this invention is to provide apparatus and process for removal of solid micron and sub-micron sized particles from a gas stream utilizing the combination of heating to render the particles liquid droplets, sonic agglomeration and cross flow filtration.

It is another object of this invention to provide apparatus and process for removal of undesired solid materials from gas streams at temperatures above the solidifying temperature of the liquid droplets.

It is yet another object of this invention to provide apparatus and process for removal of solid particulates and liquid droplets from gas streams at elevated temperatures.

It is yet another object of this invention to provide an apparatus and process for continuous removal of liquid droplets from high temperature gas streams while incurring a relatively small pressure drop across the apparatus.

It is still a further object of this invention to provide an apparatus and process for maintaining the temperature of undesired solid particulate matter in a gas stream above the solidifying temperature of the liquid droplets thereof while agglomerating the liquid droplets into larger agglomerates, and removing the agglomerates from the gas stream through a cross flow filter.

SUMMARY OF THE INVENTION

In keeping with one aspect of this invention, an apparatus for removing solid particles and/or liquid droplets, especially those having diameters of 10 microns and less, from a gas stream which may have an elevated temperature and/or pressure, comprises heating means for maintaining the temperature of the gas stream above the solidifying temperatures of the solid particles to maintain them in the liquid state; in combination with a sonic agglomerator, the liquid state enhancing the agglomeration of the droplets to form agglomerates of 10 microns and greater in diameter; and a porous cross flow filter. The filter comprises an inclined rigid porous filter element having pore diameters suitable to retain the liquid agglomerates. The liquid agglomerates continuously drip off the filter element, which prevents a filter cake from forming in the filter. A rigid, porous filter element is maintained in a filter housing having an input port in communication with the exit of the sonic agglomerator and the input side of the element. A clean gas port in the filter housing is in communication with the filter element output side for that portion of the gas stream which flows through the filter element. An exit port in the filter housing is in communication with the filter element input side through which a portion of the gas stream passes without flowing through the filter element. The liquid agglomerates are continuously removed from the filter as they drip off the filter element and pass through the exit port, and separated from the exit gas stream by flowing across a run-off collector and by the gas stream passing through a conventional quenching and scrubbing apparatus. Additional liquid droplets or solid particles may be injected into the gas stream, if desired, to remove pollutant gases by reaction therewith and to increase removal efficiency by inducing agglomeration when the gas comprises particles and/or droplets at low concentrations and/or small diameters.

BRIEF DESCRIPTION OF THE DRAWINGS

The above mentioned and other features of this invention, and the manner of obtaining them will become more apparent, and the invention will be best understood by reference to the following description of preferred embodiments of the invention taken in conjunction with the accompanying drawings in which.

DESCRIPTION OF THE PREFERRED EMBODIMENT

Figure 1:
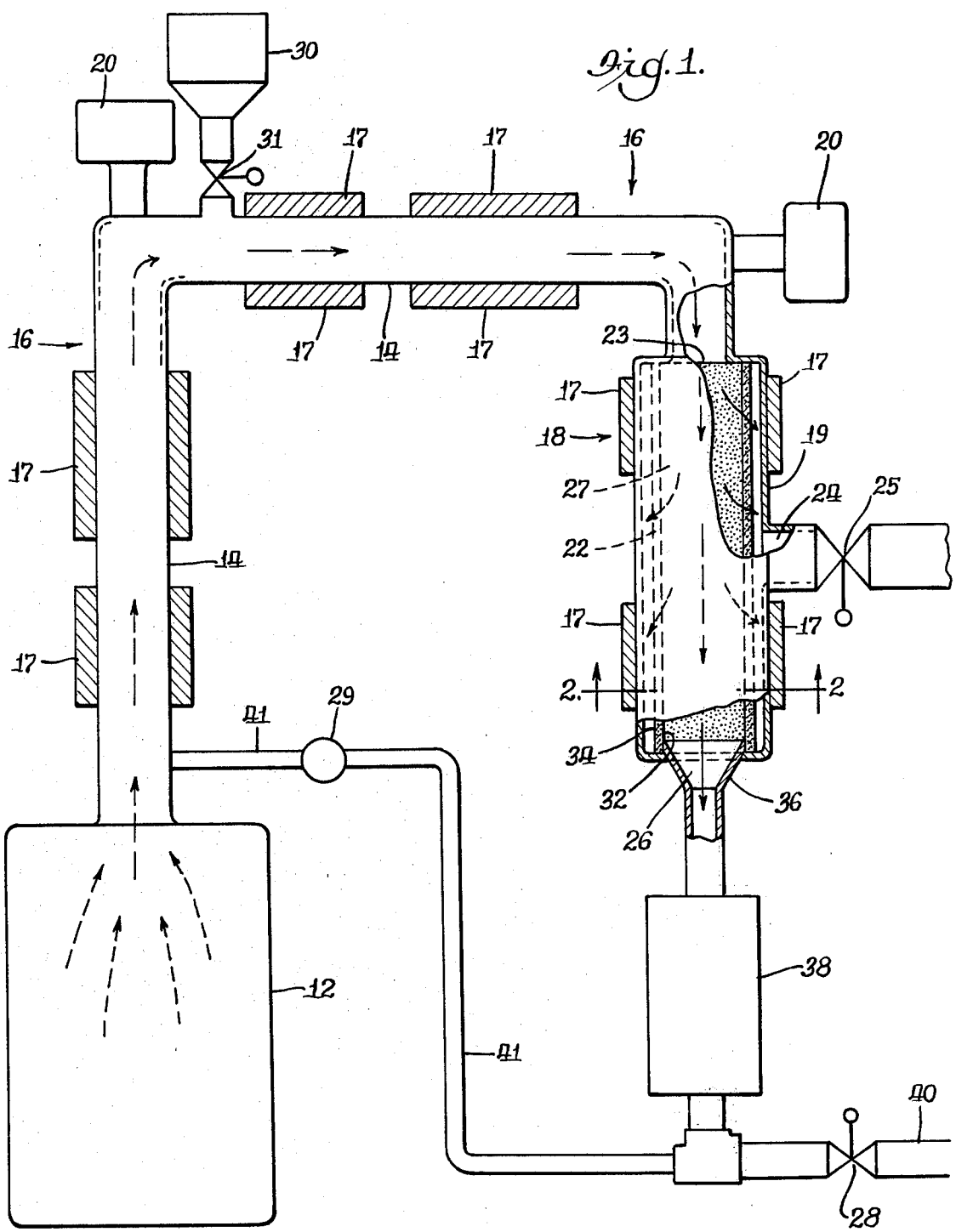
FIG. 1 is a schematic diagram of an apparatus in accordance with one embodiment of this invention.
Figure 2:
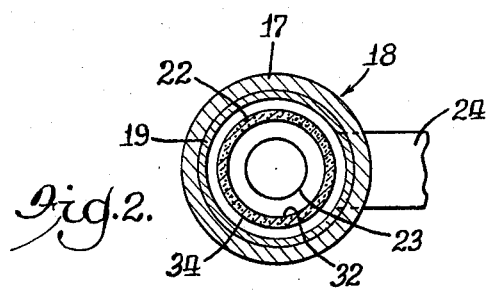
FIG. 2 is a section view, taken along lines 2—2 in FIG. 1, of the cross flow filter and heating apparatus.

As shown in FIG. 1, a gas stream comprising small liquid and/or solid particles produced in combustion chamber or reactor 12, such as a coal gasifier or similar reaction device, pass through gas conduit 14 in communication with sonic agglomerators 16 to agglomerate the undesired material and then through porous cross flow filter 18 to separate a clean gas stream from the agglomerates. Heating means 17 surrounds or passes through agglomerators 16 and filter 18. Heating means 17 may comprise any known heating means capable of maintaining the temperature of the gas stream above the solidifying temperatures of liquid droplets of undesired material. The apparatus can operate at any elevated temperature limited only by the materials of construction, usually the cross flow filter, ceramic filters limiting the maximum temperature to about 1400° C.

The clean gas stream may be used for any desired purpose, such as passed from clean gas port 24 to catalyst beds for gas upgrading, to turbines for power recovery, or may be released into the atmosphere. The gas stream from the combustion chamber entering the agglomerators comprises combustion products which may include pollutant gases, fine solid particulates and small liquid droplets which are desirably removed before the gas is used or released to the atmosphere. If the particles or droplets are not removed, catalyst beds may be plugged, and the turbines may be eroded. Pollutant removal is also desirable to preserve the environment.

Sonic agglomerates 16 comprises gas conduit 14 and at least one sound source 20 which may be provided at either end of gas conduit 14 and generate a sonic field within the gas conduit for agglomerating liquid droplets into liquid agglomerates as the gas stream passes through conduit 14. Suitable generators of sonic fields for use in this invention are well known to one skilled in the art. Suitable frequencies for agglomeration in accordance with this invention are about 3 to about 15 kHz, about 8 to about 12 kHz being preferred, at intensities of about 100 to about 170 dB, about 130 to about 160 dB being preferred. Residence time of a liquid droplet in the sonic field may be about 1 to about 20 seconds, about 2 to about 10 seconds being preferred.

The length of gas conduit 14 may vary according to the requirements of the system. Lengths in the order of about 8 to 16 feet are suitable, about 12 feet long may result in about 98 percent particulate removal from the gas stream under most desired conditions. Two or more sections of gas conduit 14 may be used as shown in FIG. 1 with the same or different sonic field properties for enhanced agglomeration. An important aspect of this invention is the more efficient agglomeration of liquid droplets as compared with solid particles. It is more effective to melt solid particles in the gas stream to provide liquid droplets throughout the system. Heating means 17 may be used, as shown in FIG. 1, to maintain undesired normally solid materials in the liquid state preferably throughout the apparatus.

The exhaust gas in gas conduit 14 may be at ambient pressure or at elevated pressures, such as effluent gas streams of combustion devices or chemical reactors having gas stream pressures of about 300 to 2000 psig. The temperature is maintained above the solidifying temperature of the material to be removed. For most purposes temperatures of about 200° to 1400° C. are suitable to prevent solidification and to minimize vaporization. It is preferred that the temperature be maintained below the boiling point of the undesired material to be removed. In the case of coal combustion, solidification of the fly ash produced can be prevented by maintaining temperatures between about 1000° C. and about 1100° C. Any suitable heating means either external to or within conduit 14 and cross flow filter 18 may be used. External heating means 17 as shown in FIG. 1, is preferred to avoid interference with the gas flow in conduit 14. Heating means 17 may be provided by means known in the art, the heat being provided by electricity, process heat or combustion heat.

Agglomeration of liquid droplets is most effective above loadings of about 1 gram/cubic meter. When agglomeration efficiency is lowered due to low loadings or very small droplet size, agglomeration efficiency may be increased by providing solid particle or liquid droplets to the gas stream. Seed hopper 30 with control means shown as valve 31 may be provided in conduit 14 as shown in FIG. 1. Solid or liquid seeds in hopper 30 may be released into conduit 14 at a rate which may be controlled by the valve 31. Introduction of seed particles or droplets should be effected far enough upstream from filter 18 and at least one of the agglomerators so that solid particles, if used, will melt, and so that the molten droplets will travel a sufficient distance in the sonic agglomerator to promote agglomeration of smaller droplets. Thus the liquid or solid seeds act as initiators of agglomeration of the small droplets when the concentration of the contaminant is so low that agglomeration does not proceed as efficiently as desired and when the mean contaminant droplet size is small and the droplets do not agglomerate to desired agglomerate size for efficient filtration. Addition of particles or drops of a specific chemical material may be added to the gas stream to cause chemical reaction of an undesired component with the added particle or drop to form a liquid reaction product for removal of the undesired gaseous component from the gas stream. For example, fine particles of alumina might be added to remove sodium and potassium vapors from the gas stream. The liquid reaction product is then removed by the cross flow filter. While FIG. 1 shows introduction of solid or liquid seeds between two agglomerators, they may be introduced upstream of the first agglomerator only, or different seeds may be introduced just upstream of each agglomerator. Likewise, any number of agglomerators may be used to achieve desired agglomeration of different materials or undesired gaseous removal from gas streams. For most gas streams, it is preferred to have 1 to about 4 agglomerators in series.

Cross flow filter 18 comprises a generally cylindrical housing 19 housing element 22 having an input side 32 and an output side 34, housing 19 has input port 23 in communication with the exit of conduit 14 and with filter element input side 32. Clean gas port 24 in housing 19 is in communication with filter element output side 34. Exit port 26 in housing 19 is in communication with filter element input side 32. Filter elements with a high surface area to volume ratio, such as filter blocks or other geometric shapes and configurations with respect to flow through gas supply may be used in place of the cylindrical shape as long as a low pressure drop gas flow through structure is provided to which input gas may be supplied to one side and clean gas removed after flowing through the filter from the other side with a portion of the input gas passing along the input side to promote cleaning of the filter input side and removal of agglomerates from the filter through an exit port in communication with the filter input side.

Cross flow filter element 22 may be any suitable material, such as sintered stainless steel or porous ceramic, having pore diameters smaller than the diameters of the agglomerated droplets. Suitable pore diameters for most systems are about 5 to about 15 microns, about 8 to about 12 microns being preferred. It is preferred that the surface area of the filter is not wetted by the liquid agglomerator to promote removal of and non-clogging by the liquid agglomerates.

Filter element 22 is maintained at an angle to the horizontal, and is preferably substantially vertical, so that liquid agglomerates will drip down the input side 32 and onto a runoff collector 36 in exit port 26. It is preferred that the surface area of runoff collector 36 is not wetted by the liquid agglomerates to prevent any build-up of agglomerates in the runoff collector. For example, the surfaces may be the same material as the cross flow filter element such as ceramic or stainless steel. A portion of the gas stream passes in contact with the input side of the filter element and out exit port 26 promoting removal of agglomerates through exit port 26. The agglomerates may then pass through conventional quenching and scrubbing apparatus 38 where they are removed or released through release port 40.

Contaminated gas enters filter 18 through input port 23 and a portion of the gas passes through filter element 22 and leaves the filter as clean gas through clean gas port 24 while the remainder of the gas stream passes through central passage 27, exit port 26, scrubbing means 38, and release port 40. The flow of gas through release port 40 and consequently through exit port 26 may be controlled by valve 28, and the flow of clean gas through clean gas port 24 may be controlled by valve 25. Valve 28 may be located in exit port 26 prior to scrubbing means 38 and terminology used herein identifying valve 28 to be in exit port 26 includes both specific locations. Valves 25 or 28 may be adjusted so that about 5 to about 50 percent of the gas stream entering filter 18 passes through central passage 27 and exit port 26, and about 50 to 95 percent of the air passes through filter element 22 and leaves filter 18 through clean air port 24. Liquid droplets smaller than the agglomerate size are retained in the gas stream passing through central passage 27 and leave the filter with the gas stream through exit port 26. Filter element 22 is self-cleaning providing continuous operation, not becoming clogged nor developing a filter cake and does not require reverse flow cleaning cycles. The agglomerator may also be located to aid in preventing clogging and enhancing the removal of liquid drops by vibrating the filter element slightly. The small quantity of dirty gas released through exit port 26 and release port 40 may subsequently be cleaned by conventional methods or may be recycled to sonic agglomerator 16 by recycle conduit 41 and injected back into conduit 14 by control means 29. Control means 29 includes suitable valve means and blower means for passage of the desired gas stream through recycle conduit 41 and into conduit 14 upstream from an agglomerator 16.

When sonic agglomeration is combined with cross flow filtration for liquid droplet removal approximately the same removal efficiency may be achieved with a 10 micron pore diameter filter as is obtained with a 2 micron pore diameter filter without sonic agglomeration. The pressure drop across the 10 micron filter is about one-half that of a 2 micron filter, which reduces the energy requirements for filtration. In addition, the power requirements of a sonic agglomerator and cross flow filter are estimated to be less than that required by a filter alone, and no more than that required by systems using a cyclone.

The combustion products generally released from industrial combustion chambers or reactors have a melting temperature of about 900° C. to about 1200° C. The boiling temperature of such materials is substantially higher. Thus, it is necessary to cool the gas stream as it passes through the sonic agglomerator and cross flow filter. Heating apparatus 17, which is commercially available or may be easily designed for specific applications, maintains a minimum temperature of at least 900° C. to about 1400° C. in the gas stream to insure that the particles are melted while still being below the boiling temperature.

The apparatus of this invention may be constructed of materials and components apparent to one skilled in the art upon reading this disclosure. Likewise, the specific design and sizing parameters of specific installations will be apparent to one skilled in the art upon reading this disclosure.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. Apparatus for removing solid particles and/or liquid droplets from gas streams comprising in combination;
   at least one sonic agglomerator comprising a gas conduit and a sound source means generating a sonic field within said gas conduit for agglomerating liquid droplets into liquid agglomerates as said gas stream passes through said conduit, said gas conduit having heating means capable of maintaining the temperature of said solid particles above the solidifying temperature of the liquid droplets thereof; and
   a cross flow filter comprising a housing and a rigid porous filter element having an input side and an output side within said housing; said filter housing having an input port in communication with the exit of said sonic agglomerator gas conduit and said filter element output side, and an exit port in said filter housing in communication with said filter element input side, said filter element having pore diameters suitable to retain said liquid agglomerates adjacent said input side of said filter element, said filter element being at an angle to the horizontal whereby a portion of said gas stream passes through said clean gas port and a portion of said gas stream and said liquid agglomerates pass through said exit port of said filter housing.

2. The apparatus of claim 1 additionally comprising a run-off collector means in flow communication with said exit port of said filter for collecting liquid agglomerates and droplets from the gas stream passing through said exit port.

3. The apparatus of claim 1 wherein said filter element comprises pores of about 5 to about 15 microns in diameter, and said apparatus comprises control means controlling passage of about 5 to about 50 percent of said gas stream through said exit port without passing through said filter element itself.

4. The apparatus of claim 3 wherein said pore diameters are about 8 to about 10 microns.

5. The apparatus of claim 3 wherein said control means comprises a valve in flow communication with said exit port.

6. The apparatus of claim 3 wherein said control means further comprises a valve in flow communication with said clean gas port for gas passing through said filter element itself.

7. The apparatus of claim 1 wherein said sound source means comprises means for maintaining a sonic field in said gas conduit of frequencies of about 3 to about 15 kHz and at an intensity of about 100 to 170 dB.

8. The apparatus of claim 7 wherein said source source means comprises means for maintaining a sonic field in said gas conduit of frequencies of about 8 to about 12 kHz and at an intensity of about 130 to about 160 dB.

9. The apparatus of claim 1 additionally comprising a seed hopper secured to said conduit on the side of at least one of said agglomerator(s) away from said cross flow filter and means secured to said seed hopper for injecting liquid or solid seed particles from said seed hopper into said conduit at a controlled rate.

10. The apparatus of claim 1 wherein said heating means comprises means for maintaining said gas stream temperatures above the solidifying temperature and below the boiling temperature of said liquid.

11. The apparatus of claim 10 wherein said heating means comprises means for maintaining said gas stream temperatures about 200° C. to about 1400° C.

12. The apparatus of claim 10 wherein said heating means comprises means for maintaining said gas stream temperatures about 200° C. to about 1400° C.

13. The apparatus of claim 1 wherein said heating means are located exterior to and in thermal transfer communication with said conduit.

14. The apparatus of claim 1 wherein said at least one sonic agglomerator comprises 2 to about 4 said sonic agglomerators in series.

15. A process for removing solid particles and/or liquid droplets from gas streams comprising the steps:
   heating and maintaining the temperature of said solid particles above the solidifying temperature of the liquid droplets thereof to form and maintain said liquid droplets thereof; agglomerating at least a substantial portion of said liquid droplets into liquid agglomerates by passing said liquid droplets through at least one sonic field, and removing said liquid agglomerates from said gas stream by passing said gas stream with said liquid agglomerates in contact with the input side of a cross flow filter having a rigid porous filter element, a portion of said gas stream passing through said filter element to an output side and through a clean gas port adjacent said output side and a portion of said gas stream and agglomerates passing through an exit port adjacent said input side, said filter element having pore diameters suitable to retain said agglomerates adjacent said input side of said filter element and being at an angle to the horizontal whereby said liquid agglomerates drip off said input side of said filter element and pass through said exit port.

16. The process of claim 15 comprising the steps of collecting said liquid agglomerates which drip down said filter element and pass through said exit port of said filter, quenching and scrubbing said exit port portion of said gas stream to remove liquid droplets from said exit port portion, and releasing said exit port portion of said gas stream into the atmosphere.

17. The process of claim 16 wherein a portion of said exit port portion of said gas stream is recycled through said sonic field.

18. The process of claim 15 wherein about 50 to about 95 percent of said gas stream passes through pores of said filter element, said pores having diameters of about 5 to about 15 microns.

19. The process of claim 18 wherein said pore diameters are about 8 to about 12 microns.

20. The process of claim 15 wherein said sonic field has a frequency of about 3 to about 15 kHz and an intensity of about 100 to about 170 dB.

21. The process of claim 15 wherein said sonic field has a frequency of about 8 to about 12 kHz and an intensity of about 130 to about 160 dB.

22. The process of claim 15 wherein the pressure of said gas stream is about 500 to about 2000 psig.

23. The process of claim 15 wherein seeds are injected into said gas stream upstream of said sonic field.

24. The process of claim 23 wherein said seeds are liquid drops.

25. The process of claim 23 wherein said seeds are solid particles.

26. The process of claim 23 wherein said seeds chemically react with an undesired component in said gas stream to form a solid or liquid reaction product.

27. The process of claim 15 wherein the residence time in said sonic field is about 1 to about 20 seconds.

28. The process of claim 15 wherein the residence time in said sonic field is about 8 to about 10 seconds.

29. The process of claim 15 wherein said at least one sonic field comprises 2 to about 4 sonic fields in series.

30. The process of claim 15 wherein said heating step maintains said gas stream at a temperature above the solidifying temperature and below the boiling temperature of said liquid droplets.

31. The process of claim 30 wherein said temperature is about 200° C. to about 1400° C.

32. The process of claim 30 wherein said temperature is about 900° C. to about 1200° C.

* * * * *